Aug. 6, 1957     I. E. FAUGHNDER     2,801,873
COMBINATION WAFFLE FORK AND SPATULA
Filed Nov. 16, 1954
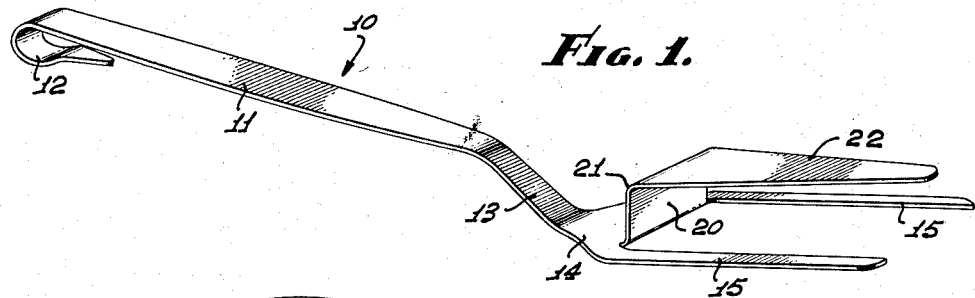
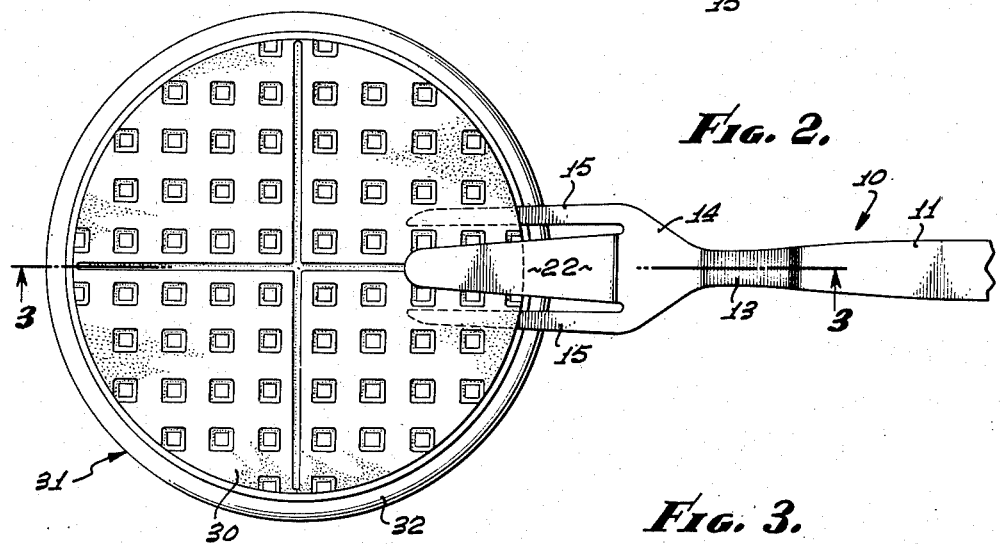
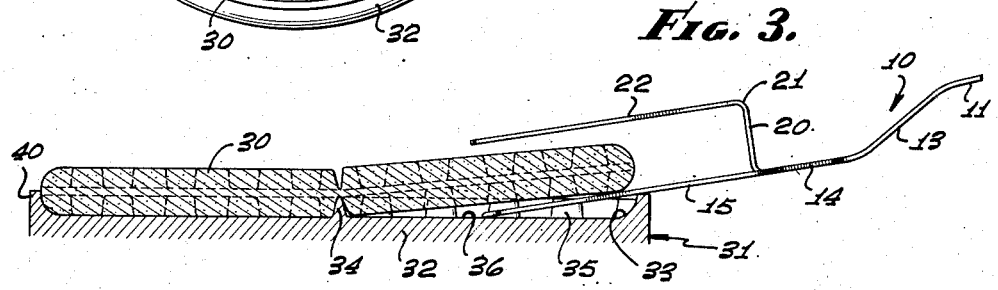
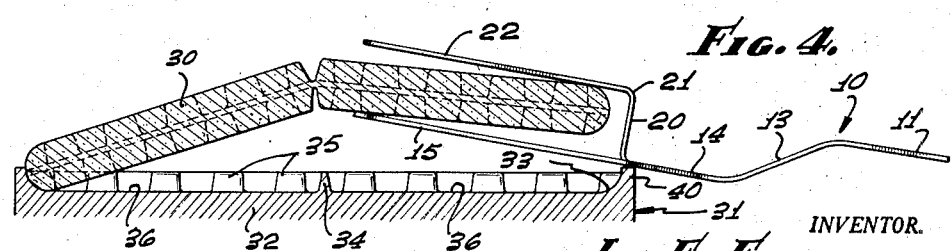
INVENTOR.
Ila E. Faughnder
BY
*Attorney.*

2,801,873
COMBINATION WAFFLE FORK AND SPATULA

Ila E. Faughnder, Los Angeles, Calif.

Application November 16, 1954, Serial No. 469,212

1 Claim. (Cl. 294—7)

This invention relates to kitchen utensils and particularly to forks.

It is a broad object of the invention to provide a novel fork having wide utility as a kitchen utensil.

Another object of the invention is to provide a fork which is particularly useful in removing waffles from a waffle iron and in transferring the waffle to a plate after it is removed from the iron.

A further object of the invention is to provide a novel fork having special utility in transferring food articles into and from an oven or broiler such as when toasting bread or broiling sandwiches and the like.

Yet another object is to provide a novel fork having wide utility as above indicated and which may also serve as a spatula.

The manner of accomplishing the foregoing objects as well as further objects and advantages will be made manifest in the following description taken in connection with the accompanying drawing in which:

Fig. 1 is a perspective view of a preferred embodiment of the invention.

Fig. 2 is a plan view of a waffle iron showing the fork of the invention in an initial step of its use in removing a waffle from said iron.

Fig. 3 is an enlarged cross sectional view taken on the line 3—3 of Fig. 2.

Fig. 4 is a view similar to Fig. 3 and shows the final step in using the invention to remove a waffle from a waffle iron.

Referring specifically to the drawings, the invention comprises a fork 10 which, in the preferred form illustrated, is die formed by stamping from sheet metal, which is preferably stainless steel.

The fork includes a handle 11 having a hook 12 at its rear end and a downwardly offset neck 13 at its forward end which terminates in a head 14.

Extending forwardly in parallelism from the outer borders of head 14 is a pair of tines 15. These tines are approximately three and a quarter inches long, a quarter of an inch wide, are pointed at their front ends and are spaced with their longitudinal axes one and one-half inches apart. The reasons for these tines having the dimensions indicated will be made clear hereinafter.

Bent upward from the head 14 between the tines 15 is a back wall 20 which extends upward about three-quarters of an inch above the plane of tines 15. Here, a right-angle bend 21 in the metal marks the upper end of wall 20 and the rear end of a central tine 22 which extends forwardly from said wall in a plane parallel with the plane of the tines 15, and spaced therefrom by the height of said wall.

The central tine 22 may be of approximately the same dimensions as one of the tines 15 and still cooperate with the latter in most of the novel functions which the fork 10 is able to perform. However, it is preferred to make central tine 22 fairly wide so that, in addition to its cooperating with tines 15 in performing the functions in which such cooperation is required, central tine 22 may also, when desired, perform the function of a spatula.

Central tine 22 is preferably coextensive in length with tines 15 but can satisfactorily perform those functions in which it cooperates with tines 15 if central tine 22 is made substantially shorter than tines 15. The front end of tine 22 thus may terminate as much as one-half inch to one inch short of the front ends of tines 15.

It is also to be understood that handles of various types may be used in the fork 10, the type shown being for illustrative purposes only.

Operation

In the drawings the fork 10 is shown being used in removing a waffle 30 from a waffle iron 31.

The waffle iron 31 is of the conventional round type in most common use. This iron includes duplicate upper and lower molds, the lower mold 32 alone being shown in the drawings.

This mold has a shallow recess 33 and is provided with crossed fins 34 dividing the recess 33 into quarters. Square, pitted bosses 35 are provided to extend upwardly in a common pattern in each of said quarters, this pattern providing straight parallel aisles 36 between adjacent rows of bosses. The aisles 36 in each of the two pairs of these which are disposed closest to the center of the mold 32 are spaced with their centers one and one-half inches apart.

Assuming that the batter used contains the shortening called for in the recipe and that the molds of the waffle iron have been properly greased and heated before starting to bake the waffle, the fork 10 is employed in the following manner to remove the waffle 30 when it is baked.

When the waffle iron molds are swung apart, one of these will usually separate from the waffle leaving the latter adhering to the other mold. Assuming that in the present instance the waffle 30 was thus left sticking to mold 32, the fork 10 is positioned with the tines 15 thereof aligned with an inner pair of the aisles 36 of said mold and said tines inserted beneath the waffle and into and along said aisles as shown in Figs. 2 and 3.

This pries waffle 30 from mold 32 back to the cross fin 34 towards which the fork is being advanced. This accomplished, the fork 10 is rocked back around the perimetral wall 40 of the mold 32, thus raising the tips of tines 15 beneath a central portion of the waffle. This lifts the back half of the waffle 30 from the waffle mold 32, thus entirely freeing the waffle for removal from the waffle iron.

The presence of the central tine 22, as shown in Fig. 4, holds the waffle 30 in the fork and permits the waffle to be lifted from the iron to a service plate immediately upon the waffle being freed from mold 32 in the manner above described.

Should the waffle come free from mold 32, when the iron is opened, and stick to the other mold, the same steps as above described are followed in using fork 10 in removing the waffle and transferring it to a service plate.

While fork 10 is of special utility in thus removing and handling waffles, it is serviceable with great advantage in handling any food articles susceptible to separate handling which must be placed in and removed from an oven or broiler where direct use of the hands is not practical.

Thus steaks may be placed in a broiler, shifted around, turned, and removed by fork 10. It can be used also for placing in and removing from the oven or broiler, bread or sandwiches to be toasted or broiled.

The spacing of tines 15 and 22 have also been found to make the fork 10 an excellent utensil for beating mashed potatoes to make these fluffy.

I claim:

An implement comprising a handle, a head, a spatula and two spaced apart tines, said handle comprising an elongate hand gripping portion and a neck portion, said hand gripping portion lying completely in a plane between the planes of the spatula and the tines and the long axis of the hand gripping portion being substantially parallel with the long axis of the spatula and tines, said head portion being flat and having a width materially greater than the handle and lying in the plane of the tines and having the tines fixed thereto, the neck portion extending obliquely in relation to the handle and connecting the head portion with the hand gripping portion, a wall portion joined to the head portion between the head attached ends of the tines and extending perpendicularly to the said plane of the tines, said spatula being connected to the wall portion and extending therefrom in the same direction as the tines and said spatula and tines being of approximately the same length, the overall width of the spatula being less than the distance between the tines.

References Cited in the file of this patent

UNITED STATES PATENTS

| | | |
|---|---|---|
| 1,089,118 | Emory | Mar. 3, 1914 |
| 2,087,938 | Strozut | July 27, 1937 |
| 2,425,604 | Eckhoff | Aug. 12, 1947 |